FIG. 1

United States Patent Office 3,291,714
Patented Dec. 13, 1966

3,291,714
ELECTRODES
John Robert Hall, Blackburn, Victoria, and Johannes Theodorus Van Gemert, Lalor, Victoria, Australia, assignors to Imperial Chemical Industries of Australia and New Zealand Limited, Melbourne, Australia, a corporation of Australia
Filed Jan. 8, 1962, Ser. No. 164,854
Claims priority, application Australia, Jan. 13, 1961, 363/61
25 Claims. (Cl. 204—256)

This invention relates to electrodes for use in electrolytic cells.

In the electrolytic cells for the electrolysis of brine or in direct current generators such as fuel cells, the cathodes most commonly used at present are made from iron or steel. Such electrodes, because of their low corrosion resistance in acidic media, impose limitations on the cell design; thus, e.g., they must not come into direct contact with the anolyte because of the rapid attack of halogens on iron in aqueous medium. Consequently, these electrodes are unsuitable for use in bipolar cells.

Furthermore, it is well-known that the voltage drop between the anode and cathode in an electrolytic cell in which gases are generated at the electrodes is made up of a number of components, one of which is the overvoltage for the particular gases and for the particular electrodes concerned.

In industrial applications of electrolytic cells it is very important from the point of view of operating costs to reduce to a minimum the voltage drop for an electrolytic process and this therefore leads to the use of electrodes having the lowest overvoltage potentials in the system employed. For example, it is customary in alkaline cells involving evolution of hydrogen and oxygen to use a nickel anode and an iron cathode.

In certain cells it is important for reasons other than operating cost to reduce the voltage drop to a minimum. Thus in certain cases the constructional design of the cell may be materially simplified by reducing the voltage drop by even as low as 0.1 volt.

Recently, electrodes have been developed which overcome the corrosion problems associated with steel electrodes and which do not need regular replacement as graphite electrodes do and which are resistant to both anolyte and catholyte, thus permitting the design of bipolar cells assembled into multi-cell units. Such cells are described in Australian Patent No. 230,799. In these multi-cells a bipolar titanium electrode forms the partition wall separating two adjacent cells, one side of the electrode being the cathode of one cell and the other side of the electrode being the anode of the adjacent cell. As a result these cells are extremely compact, require no costly and energy-wasting electrical connections between anodes and cathodes, have a small electrode gap and consequently a low potential drop through the electrolyte, a small potential drop through the electrode itself and permit high current densities; hence these cells have a low overall operating voltage and high production capacity per unit floor area and capital cost. However, titanium sheet has a relatively high hydrogen overvoltage.

It is also known that finely divided platinum or palladium coatings deposited on the iron support of the electrode overcome the disadvantages associated with steel electrodes by reducing the hydrogen overvoltage, but such deposits are very expensive and not always durable enough to be economical.

We have now discovered that certain alloys can be deposited on metallic, particularly steel, electrodes in general and on titanium core electrodes in particular to form electrodes of considerable durability which have a reduced hydrogen overvoltage when used as cathodes in electrolytes.

Accordingly we provide an electrode comprising a support formed from a metal suitable for the construction of solid electrodes, at least a portion of the surface of which is conductively covered by a coating of an alloy consisting of a metal selected from the group of molybdenum and tungsten alloyed with iron.

We also provide an electrode comprising a support formed from a metal suitable for the construction of solid electrodes, at least a portion of the surface of which is conductively covered by a coating of an alloy consisting of molybdenum alloyed with a secondary metal selected from the group of nickel and cobalt.

A further embodiment of this invention consists in an electrode comprising a support formed from a metal suitable for the construction of solid electrodes, at least a portion of the surface of which is conductively covered by a coating of a ternary alloy consisting of a primary metal selected from the group of molybdenum and tungsten alloyed with two secondary metals selected from the group of cobalt, nickel and iron.

We furthermore provide an electrolytic cell having a cathode formed from a metal suitable for the construction of solid electrodes, a portion or the whole of the surface of which is conductively covered by either a coating of an alloy consisting of a primary metal selected from the group of molybdenum and tungsten alloyed with iron or, alternatively, covered by a coating of an alloy consisting of molybdenum as a primary metal alloyed with a secondary metal selected from the group of nickel or cobalt or, alternatively, covered by a coating of a ternary alloy consisting of a primary metal selected from the group of molybdenum and tungsten alloyed with two secondary metals selected from the group of cobalt, nickel and iron.

One preferred metal of the electrode supporting the alloy coating is iron, conveniently in the form of mild steel. Another preferred metal is titanium which is defined throughout this specification as pure titanium or a titanium alloy containing more than 50% by weight of titanium, which is known as a titanium base alloy.

The electrodes of the invention may be in the form of wire, tube, rod, planar or curved sheet, perforated sheet, expanded metal, foraminous metal, gauze, porous, compacted or fused metal powder.

While the electrodes of this invention can be used as cathodes generally they are particularly useful as hydrogen cathodes, i.e., when hydrogen is deposited on or evolved from them.

When the electrodes of the present invention are used as cathodes in fuel cells, a higher operating voltage, faster reaction rate, improved capacity and better energy efficiencies are attained.

Accordingly, we also provide a process of producing electric current from a fuel cell characterised in that the cathode of the fuel cell is an electrode according to the present invention.

The preferred use of the invention is in electrolytic processes for the production of hydrogen from aqueous electrolytes.

Accordingly, we provide a process of electrolysing an aqueous electrolyte characterised in that hydrogen is evolved electrolytically from a cathode according to the present invention.

The cathodes of our invention are particularly useful for the electrolysis of alkali chloride solution to produce hydrogen, alkali hydroxide and chlorine or, alternatively, to produce alkali chlorate. When hydrogen, sodium hydroxide and chlorine are produced from brine using the cathodes of this invention, a considerably reduced operating voltage and improved energy efficiency and corrosion resistance are attained.

A preferred embodiment of this invention comprises an electrolytic cell suitable for electrolysis of aqueous sodium chloride solution characterised in that the cathode is an electrode according to this invention.

Another preferred embodiment of the invention is a bipolar electrode consisting of a core of titanium, at least portion of the anodic surface of which is conductively covered by a layer of a noble metal of the platinum group and at least portion of the cathodic surface of which is conductively covered either by a coating of an alloy consisting of a metal selected from the group of molybdenum and tungsten alloyed with iron or, alternatively, covered by a coating of an alloy consisting of molybdenum and a secondary metal selected from the group of cobalt and nickel or, alternatively, covered by a coating of a ternary alloy consisting of a primary metal selected from the group of molybdenum and tungsten alloyed with two secondary metals selected from the group of cobalt, nickel and iron.

By a "noble metal of the platinum group" or "platinum metals" we mean ruthenium, rhodium, palladium, osmium, iridium or platinum or an alloy of two or more of these metals.

Furthermore, we provide an electrolytic cell suitable for assembly into multicells of the kind described in Australian Patent No. 230,799 comprising a bipolar electrode made from a core of titanium, at least portion of the anodic surface of which is covered conductively by a layer of a noble metal of the platinum group and at least portion of the cathodic surface of which is conductively covered either by a coating of an alloy consisting of a metal selected from the group of molybdenum and tungsten with iron or, alternatively, covered by a coating consisting of an alloy of molybdenum with a metal selected from the group of cobalt and nickel or, alternatively, covered by a coating of a ternary alloy consisting of a primary metal selected from the group of molybdenum and tungsten alloyed with two secondary metals selected from the group of cobalt, nickel and iron, which bipolar electrode forms the dividing wall between the cathodic and the anodic compartments of adjacent cells. With cells of the latter type, if desired, as an alternative to the use of noble metals as anodic surface layers, the opposite side of the titanium sheet to that coated with molybdenum or tungsten alloy may be connected conductively to a graphite anode.

The preferred range of composition for the molybdenum or tungsten alloys is shown on the left hand side of Table I. If the composition is kept within the most preferred range shown on the right hand side of Table I, the maximum reduction in hydrogen overvoltage is achieved.

All percentages in this specification are given by weight.

It has been established that electro-deposited layers contain varying amounts, up to several percent, of non-metallic constituents such as oxide. In these low concentrations the metallic oxides present do not affect the overvoltage within the errors of measurement; hence all results are given as a percentage of the metallic constituents only. The analysis of very thin layers of alloys is fraught with difficulties; consequently the figures stated are thought to be accurate to within ±2% only.

TABLE I

| Alloy AB | | Preferred Composition Range | | Most Preferred Composition Range | |
|---|---|---|---|---|---|
| A | B | Primary Constituent A in Percent Weight | Secondary Constituent B in Percent Weight | Primary Constituent A in Percent Weight | Secondary Constituent B in Percent Weight |
| Mo | Fe | 5 to 70% Mo | (100−A)% Fe | 45 to 65% Mo | (100−A)% Fe |
| W | Fe | 5 to 60% W | (100−A)% Fe | 35 to 60% W | (100−A)% Fe |
| Mo | Co | 5 to 70% Mo | (100−A)% Co | 45 to 70% Mo | (100−A)% Co |
| Mo | Ni | 5 to 65% Mo | (100−A)% Ni | 45 to 58% Mo | (100−A)% Ni |

| Alloy ABC | | | Preferred Range | | | Most Preferred Range |
|---|---|---|---|---|---|---|
| A | B | C | Primary Constituent A in Percent Weight | Secondary Constituent B in Percent Weight | Tertiary Constituent C in Percent Weight | Primary Constituent A in Percent Weight |
| Mo | Ni | Fe | 5 to 60% Mo | (100−A−C)% Ni | (100−A−B)% Fe | 50 to 60% Mo |
| Mo | Ni | Co | 5 to 60% Mo | (100−A−C)% Ni | (100−A−B)% Co | 50 to 60% Mo |
| Mo | Co | Fe | 5 to 60% Mo | (100−A−C)% Co | (100−A−B)% Fe | 50 to 60% Mo |
| W | Co | Ni | 5 to 60% W | (100−A−C)% Co | (100−A−B)% Ni | 50 to 60% W |
| W | Co | Fe | 5 to 60% W | (100−A−C)% Co | (100−A−B)% Fe | 50 to 60% W |

The cathodic alloy surfaces of the present invention may be applied to the surface of the metal support by a number of methods known "per se." They may be deposited by electroplating, by sintering a mixture of the powdered alloy metals under the application of heat, with or without pressure, by roll-binding, vacuum depositing, metal spraying or rolling the powdered alloy or a mixture of the powdered metals on to the metal sheet, or by painting metallising solution of the alloy on to a metal sheet and subsequent firing, where the metals of the alloy coating are applied in a finely divided form in an organic solvent resin system.

The preferred method of deposition of the alloy is by electroplating.

Numerous compositions of electroplating baths which may be used for depositing these alloys on metals have been published in the literature. For tungsten alloys, either tungsten trioxide or a soluble tungstate is used together with a salt of the co-depositing metal. Hydroxy-organic acids or their sodium and potassium salts are conventionally added to complex the iron group metals, ammonium chloride or sulphate may be added and some baths also comprise inert salts such as sodium or potassium chloride. Molybdenum alloy plating baths are similar to tungsten baths in composition, with molybdenum trioxide or a soluble molybdate replacing the analogous tungsten compounds. The hydrogen ion concentration of the bath may be adjusted to the desired value with aqueous ammonia or sodium hydroxide solutions. Many modern baths employ citric or tartaric acid or their sodium and/or potassium salts. Plating techniques have been described, e.g., in the following articles:

A. Brenner, P. Burkhead and E. Seegmiller, Journal Research of the Natl. Bur. Standards, 39, 351 (1947), and T. F. Frantsevich-Zabludovskaya, A. I. Zayats and V. T. Barchuk, Ukrain, Khim. Zhur. 25, 713 (1959).

While these and other known baths provide coatings which are satisfactory for varying periods of time we have found that particularly durable coatings can be prepared from certain compositions.

Accordingly, we also provide a method of electroplating a metal suitable for the construction of solid electrodes with a molybdenum-nickel alloy from a plating bath comprising from 32 to 45 g. of $NaMoO_4 \cdot 2H_2O$, from 10 to 13 g. of $NiCl_2 \cdot 6H_2O$, from 27 to 40 g. of $Na_4P_2O_7$ and from 70 to 100 g. of $NaHCO_3$ per litre of aqueous solution at a (direct) current density from 2 to 25 a./dm.$^2$ and a temperature from 40 to 70° C.

We provide further a method of electroplating a metal suitable for the construction of solid electrodes with a molybdenum-nickel-cobalt alloy from a bath containing from 32 to 45 g. of $Na_2MoO_4 \cdot 2H_2O$, from 5.2 to 6.2 g. of $NiCl_2 \cdot 6H_2O$, from 5.4 to 6.5 g. of $CoCl_2 \cdot 6H_2O$, from 36 to 54 g. of $Na_4 \cdot P_2O_7 \cdot 10H_2O$, from 70 to 100 g. of $NaHCO_3$ and from 1.2 to 1.9 g. of $N_2H_4 \cdot H_2SO_4$ per litre of aqueous solution at a current density between 2.5 and 15 a./dm.$^2$ and a temperature from 55 to 75° C.

We also provide a method of electroplating a metal suitable for the construction of solid electrodes with a molybdenum-nickel-iron alloy from a bath containing 32 to 45 g. of $Na_2MoO_4 \cdot 2H_2O$, 4 to 5 g. of $FeCl_3 \cdot 6H_2O$, 5.4 to 6.6 g. of $NiCl_2 \cdot 6H_2O$, 36 to 54 g. of $$Na_4P_2O_7 \cdot 10H_2O$$

70 to 100 g. of $NaHCO_3$ and 1.2 to 1.8 g. of $N_2H_4 \cdot H_2SO_4$ at current densities between 5 and 15 a./dm.$^2$ and a temperature from 50 to 70° C.

As yet another method of electroplating metals suitable for construction of solid electrodes according to a further feature of the present invention comprises plating titanium or a titanium alloy containing at least 50% by weight of titanium with a molybdenum-iron-cobalt alloy from a bath containing 32 to 45 g. of $Na_2.MoO_4 2H_2O$, 4 to 5 g. of $FeCl_3.6H_2O$, 5.3 to 6.5 g. of $CoCl_2.6H_2O$, 36 to 54 g. of $Na_4P_2O_7.10H_2O$, 70 to 100 g. of $NaHCO_3$ and 1.2 to 1.8 g. of $N_2H_4.H_2SO_4$ at a current density from 5 to 15 a/dm.$_2$ and a temperature between 50 and 70° C.

The surface of the metal sheet may be subjected to pretreatments to facilitate the depositing of the alloy layer and its surface area may be increased by surface treatment or by manufacturing the titanium sheet by rolling titanium in powder form to produce a compacted sheet of vast surface area. A number of methods of pretreatment and of increasing the surface area of the metal sheet are known "per se." Most of these pretreatments provide satisfactory deposition and adhesion of the alloy coating on the titanium support, but their durability under prolonged mechanical and chemical attack varies greatly. Many coatings under practical plant conditions last no longer than a few weeks. We have found that particularly durable deposits of our alloys can be produced on titanium, which otherwise is difficult to plate durably and satisfactorily, when the titanium is pretreated with fluoroboric acid.

Accordingly we also provide a method of electroplating titanium to produce the electrodes of the present invention characterised by pretreating the titanium with a solution of fluoroboric acid containing not less than 2% w./v. of fluoroboric acid.

Compared with platinised titanium cathodes the Ti-cathodes of the present invention have the advantage of considerably lower capital cost; compared with conventional iron or steel cathodes they have the advantage that they have a lower hydrogen overvoltage and that they are more corrosion resistant and consequently that they are suitable for construction of bipolar electrodes for use in electrolytic multicells, which are a considerable advance over the prior art of separate iron cathodes and graphite anodes; finally, compared with a composite bipolar electrode in which an iron grid or sheet used as a cathode is compressed conductively against or welded to the reverse side of a titanium sheet or a platinised titanium sheet anode it has the advantage of much simplified construction, greater compactness, simpler maintenance and freedom from the corrosion difficulties resulting from bi-metallic joints. Yet another advantage of this invention is that the electrodes can be prepared from existing mold steel electrodes by plating the steel electrodes after descaling pretreatment. Thus no large capital expenditure is required for converting existing electrolytic cells into cells having the reduced cathode overvoltage of the present invention.

The lowering of the overvoltage on the cathodes of the present invention may be demonstrated in pure alkali chloride and iodide solutions or in the solutions normally encountered in the electrolyte of diaphragm cells and in chlorate and iodate cells. When bipolar electrodes according to the preferred embodiment of this invention are assembled into electrolytic multicells, and sodium chloride is electrolysed to produced either, in the case of the diaphragm cell, sodium hydroxide and chlorine or, in the case of the chlorate cells, sodium chlorate, current efficiencies are obtained which are comparable to those of the conventional diaphragm and chlorate cells. Energy efficiencies, however, particularly at high current densities, are superior to those of the electrolytic multicells in which the titanium is used as a cathode and are as good as or better than those obtained from electrolytic multicells with platinised cathode and platinised anode surfaces or with platinised anodes and conductively connected iron cathodes.

The reduced hydrogen overvoltage of the cathodes of the present invention under practical operating conditions compared with the mean attainable cathode potential of "aged," i.e., well rusted steel electrodes, with unplated titanium electrodes and with platinised titanium electrodes is apparent from Table II. It is well known and was confirmed during these experiments that rusted steel electrodes have the lowest cathode potential which can, in practice, be attained from steel electrodes.

The voltages stated in Table II include liquid junction potentials and the small ohmic potential drop of the column o felectrolyte between the cathode and the tip of the Luggin capillary and the potential arising from the concentration polarisation at the cathode surface and hence are not indicative of overvoltages in the strictly scientific sense, but the measurements are strictly comparable between experiments.

TABLE II

[Temperature 60° C.]

| Surface composition of plated mild steel cathode | Example No. | Composition by weight | Cathode potential versus standard hydrogen electrode in volts | Lowering of overvoltage compared with rusted mild steel | Current density a/dm.$^2$ | Electrolyte aqueous solution |
|---|---|---|---|---|---|---|
| Rusted mild steel, not plated (basis for comparison). | 1 | | 1.05<br>1.20<br>1.28 | | 1<br>10<br>30 | 100 g./l. NaOH, 200 g./l. NaCl. |
| Tungsten-iron alloy | 2 | 55% W, 45% Fe | 0.96<br>1.02<br>1.05 | 0.09<br>0.18<br>0.23 | 1<br>10<br>30 | |

TABLE II.—Continued
[Temperature 60° C.]

| Surface composition of plated mild steel cathode | Example No. | Composition by weight | Cathode potential versus standard hydrogen electrode in volts | Lowering of overvoltage compared with rusted mild steel | Current density a/dm.$^2$ | Electrolyte aqueous solution |
|---|---|---|---|---|---|---|
| Tungsten-iron alloy | 3 | 38% W, 62% Fe | 0.97 | 0.08 | 1 | |
| | | | 1.05 | 0.15 | 10 | |
| | | | 1.09 | 0.19 | 30 | |
| Molybdenum-cobalt alloy | 4 | 44% Mo, 56% Co | 0.90 | 0.15 | 1 | |
| | | | 0.96 | 0.24 | 10 | |
| | | | 0.99 | 0.29 | 30 | |
| Molybdenum-cobalt alloy | 5 | 67% Mo, 33% Co | 0.91 | 0.14 | 1 | |
| | | | 0.98 | 0.22 | 10 | |
| | | | 1.01 | 0.27 | 30 | |
| Molybdenum-cobalt alloy | 6 | 45% Mo, 55% Co | 0.93 | 0.12 | 1 | |
| | | | 1.00 | 0.20 | 10 | |
| | | | 1.03 | 0.25 | 30 | |
| Molybdenum-nickel alloy | 7 | 56% Mo, 44% Ni | 0.90 | 0.15 | 1 | |
| | | | 0.95 | 0.25 | 10 | |
| | | | 0.97 | 0.31 | 30 | |
| Molybdenum-nickel alloy | 8 | 49% Mo, 51% Ni | 0.88 | 0.17 | 1 | |
| | | | 0.92 | 0.28 | 10 | |
| | | | 0.94 | 0.34 | 30 | |
| Molybdenum-nickel alloy | 9 | 50% Mo, 50% Ni | 0.90 | 0.15 | 1 | |
| | | | 0.95 | 0.25 | 10 | |
| | | | 0.97 | 0.31 | 30 | |
| Molybdenum-iron alloy | 10 | 55% Mo, 45% Fe | 0.93 | 0.12 | 1 | |
| | | | 0.99 | 0.21 | 10 | |
| | | | 1.02 | 0.26 | 30 | |
| Molybdenum-iron alloy | 11 | 62% Mo, 38% Fe | 0.91 | 0.14 | 1 | |
| | | | 1.02 | 0.18 | 10 | |
| | | | 1.07 | 0.21 | 30 | |
| Molybdenum-iron-cobalt alloy | 12 | 55% Mo | 0.92 | 0.13 | 1 | |
| | | | 0.99 | 0.21 | 10 | |
| | | | 1.02 | 0.26 | 30 | |
| Molybdenum-nickel-iron alloy | 13 | 55% Mo | 0.90 | 0.15 | 1 | |
| | | | 0.95 | 0.25 | 10 | |
| | | | 0.98 | 0.30 | 30 | |
| Molybdenum-nickel-cobalt alloy | 14 | 55% Mo | 0.88 | 0.17 | 1 | |
| | | | 0.91 | 0.29 | 10 | |
| | | | 0.93 | 0.35 | 30 | |
| Molybdenum-nickel alloy | 15 | 25% Mo, 75% Ni | 0.96 | 0.09 | 1 | |
| | | | 1.10 | 0.10 | 10 | |
| | | | 1.16 | 0.12 | 30 | |
| Titanium 130 sheet (unplated) | 18 | 100% | 1.12 | | 1 | |
| | | | 1.27 | | 10 | |
| | | | 1.36 | | 30 | |
| Mild steel (rusted) (unplated) | 18 | | 1.05 | 0.07 | 1 | 100 g./l. NaOH, 200 g./l. NaCl. |
| | | | 1.20 | 0.07 | 10 | |
| | | | 1.28 | 0.08 | 30 | |
| Molybdenum-nickel alloy | 18 | 75% Ni, 25% Mo | 0.97 | 0.15 | 1 | |
| | | | 1.05 | 0.22 | 10 | |
| | | | 1.09 | 0.27 | 30 | |
| Tungsten-iron alloy | 19 | 52% W, 48% Fe | 0.96 | 0.16 | 1 | |
| | | | 1.02 | 0.25 | 10 | |
| | | | 1.05 | 0.31 | 30 | |
| Tungsten-iron alloy | 20 | 55% W, 45% Fe | 0.89 | 0.23 | 1 | |
| | | | 1.01 | 0.26 | 10 | |
| | | | 1.07 | 0.29 | 30 | |
| Tungsten-iron alloy | 21 | 58% W, 42% Fe | 0.99 | 0.13 | 1 | |
| | | | 1.05 | 0.22 | 10 | |
| | | | 1.08 | 0.28 | 30 | |
| Molybdenum-iron alloy | 22 | 50% Mo, 50% Fe | 0.93 | 0.19 | 1 | |
| | | | 0.98 | 0.29 | 10 | |
| | | | 1.00 | 0.36 | 30 | |
| Molybdenum-iron alloy | 23 | 59% Mo, 41% Fe | 0.96 | 0.16 | 1 | |
| | | | 1.02 | 0.25 | 10 | |
| | | | 1.05 | 0.31 | 30 | |
| Molybdenum-nickel alloy | 24 | 56% Mo, 44% Ni | 0.90 | 0.22 | 1 | |
| | | | 0.95 | 0.32 | 10 | |
| | | | 0.97 | 0.39 | 30 | |
| Molybdenum-nickel alloy | 25 | 49% Mo, 51% Ni | 0.91 | 0.21 | 1 | |
| | | | 0.96 | 0.31 | 10 | |
| | | | 0.98 | 0.38 | 30 | |
| Molybdenum-cobalt alloy | 26 | 54% Mo, 46% Co | 0.90 | 0.22 | 1 | |
| | | | 0.98 | 0.29 | 10 | |
| | | | 1.02 | 0.34 | 30 | |
| Molybdenum-cobalt alloy | 27 | 62% Mo, 38% Co | 0.92 | 0.20 | 1 | |
| | | | 0.98 | 0.29 | 10 | |
| | | | 1.01 | 0.35 | 30 | |
| Molybdenum-nickel-cobalt alloy | 28 | 56% Mo | 0.88 | 0.24 | 1 | |
| | | | 0.91 | 0.36 | 10 | |
| | | | 0.93 | 0.43 | 30 | |
| Molybdenum-nickel-cobalt alloy | 29 | 55% Mo | 0.91 | 0.21 | 1 | |
| | | | 0.97 | 0.30 | 10 | |
| | | | 1.00 | 0.36 | 30 | |
| Molybdenum-nickel-iron alloy | 30 | 55% Mo | 0.91 | 0.21 | 1 | |
| | | | 0.97 | 0.30 | 10 | |
| | | | 1.00 | 0.36 | 30 | |
| Molybdenum-cobalt-iron alloy | 31 | 55% Mo | 0.92 | 0.20 | 1 | |
| | | | 0.99 | 0.28 | 10 | |
| | | | 1.02 | 0.34 | 30 | |

Electrolytic cells incorporating electrodes according to the present invention will now be described with reference to the accompanying diagrammatic drawings.

In these drawings.

Figure 1:
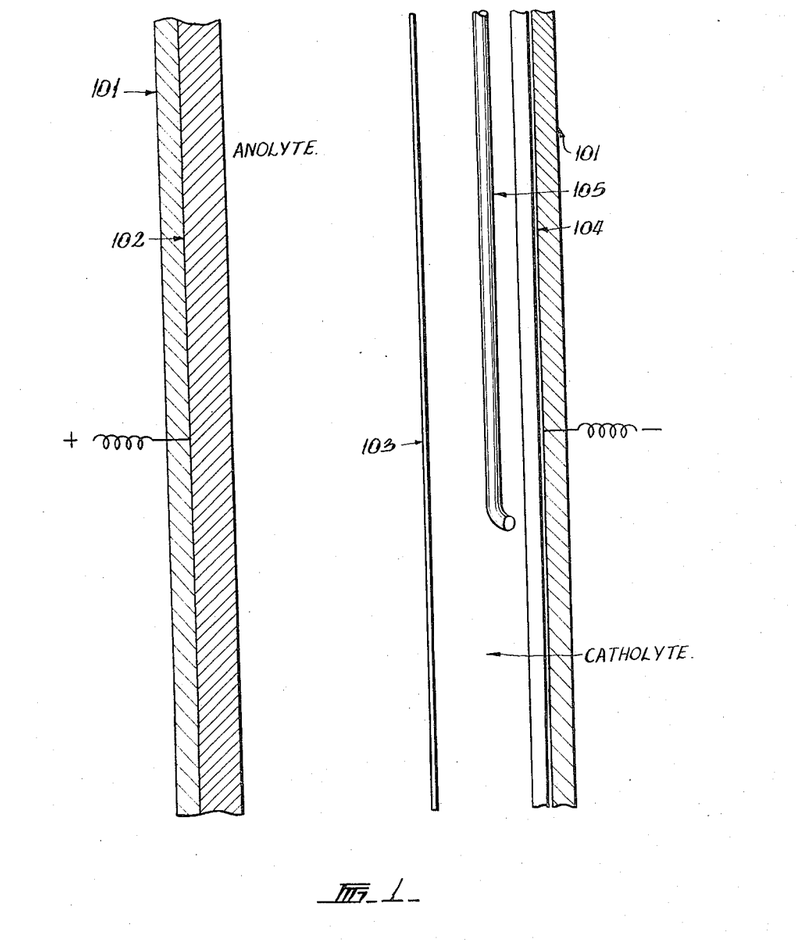
FIG. 1 is a schematic vertical cross-section through the centre of a diaphragm cell at 90° to the electrodes.

The laboratory experiments 1 to 15 were carried out on a model diaphragm cell of the vertical submerged cathode type shown schematically in FIG. 1. The cell was a glass vessel the ratio of height to width (cross section through cell) to length (plane of electrodes and diaphragm) being approximately 2:1:1. Referring to FIG. 1 of the drawings, the cell walls 101 consisted of glass; all liquid-tight joints were made by silicone rubber gaskets. A graphite anode 102 and the interchangeable cathode 104, insulated from each other, were connected to the opposing electrodes of a source of direct current. Anode and cathode compartment were separated from each other by a permeable porous, polyethylene diaphragm 103. To prevent back diffusion of anode products a relatively large flow of electrolyte through the cell compartments was maintained. Inlets and outlets for feed of electrolyte and discharge of catholyte, hydrogen and chlorine not shown in the sketch were arranged in the manner usual with diaphragm cells of the submerged, vertical cathode type and known to those skilled in the art.

The cathode potential was measured by means of a Luggin capillary 105 which penetrated the glass cell wall at the top of the cell to extend to a position slightly spaced from the centre of the cathode. The Luggin capillary was connected by a salt bridge to an individual calomel reference electrode (not shown) in the usual manner. The electrolyte discharged from the cell contained 100 g. NaOH and 200 g. NaCl per litre. The interchangeable cathodes were prepared as set out in the examples and a series of determinations was carried out at each selected current density after careful equilibration of experimental conditions. The results shown in Table II are the means of the replicate determinations.

Figure 2:
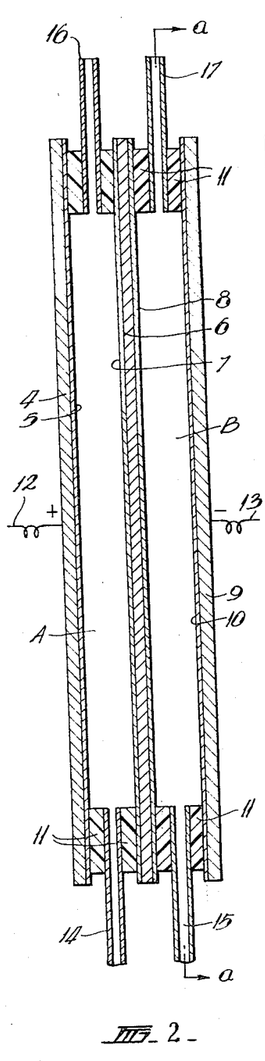
FIG. 2 is a vertical cross-section through the centre of a chlorate cell assembly of the bipolar type.
Figure 3:
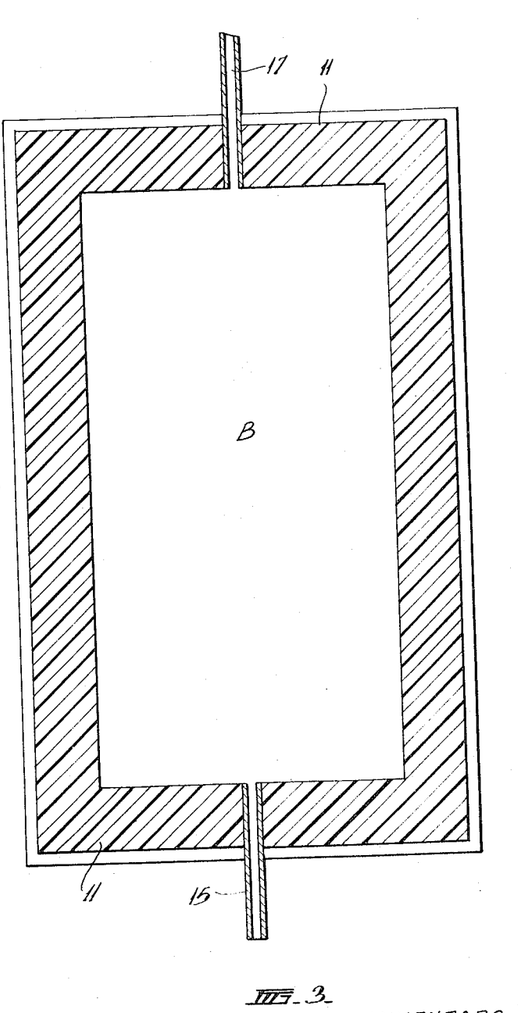
FIG. 3 is a vertical cross-section of the chlorate cell assembly on the line a—a of FIG. 2.

Referring now to FIGS. 2 and 3 of the drawings, the bipolar chlorate cell assembly there illustrated consists of two cells A and B identical in size. The outer end of the cell A consists of a titanium sheet 4 to the inner surface of which a coating 5 of platinum has been applied. The opposite wall of the cell A is constituted by a titanium sheet 6, the inner surface 7 of which has been etched. The other side of the titanium sheet 6 has a platinum coating 8 applied to constitute the inner wall of the cell B. The opposite wall of the cell B consists of a titanium sheet 9, the inner surface of which has been coated to a depth of approximately 0.002 cm. with an alloy 10 of approximately 45% by weight of molybdenum and 55% by weight of cobalt. The sheets 4, 6 and 9 are spaced apart to form the liquids-tight cells A and B by rectangular polythene washers 11 engaging the sheets adjacent to the periphery thereof.

An electric conductor 12 is connected to the positive terminal of a source (not shown) of direct current, and a further electric conductor 13 is connected to the negative terminal of the same source. The sheet 4 thus constitutes the anode of the cell A, the cathode being the etched surface 7 of the sheet 6. The platinum coating on the sheet 6 is the anodic surface of the cell B, the cathodic surface being the alloy coating 10. Electrolyte may enter and leave the cells A and B through pipes 14, 15, 16 and 17 which extend through the washers 11. If desired, cell assemblies comprising more than two cells can be constructed in an analogous manner.

Figure 4:
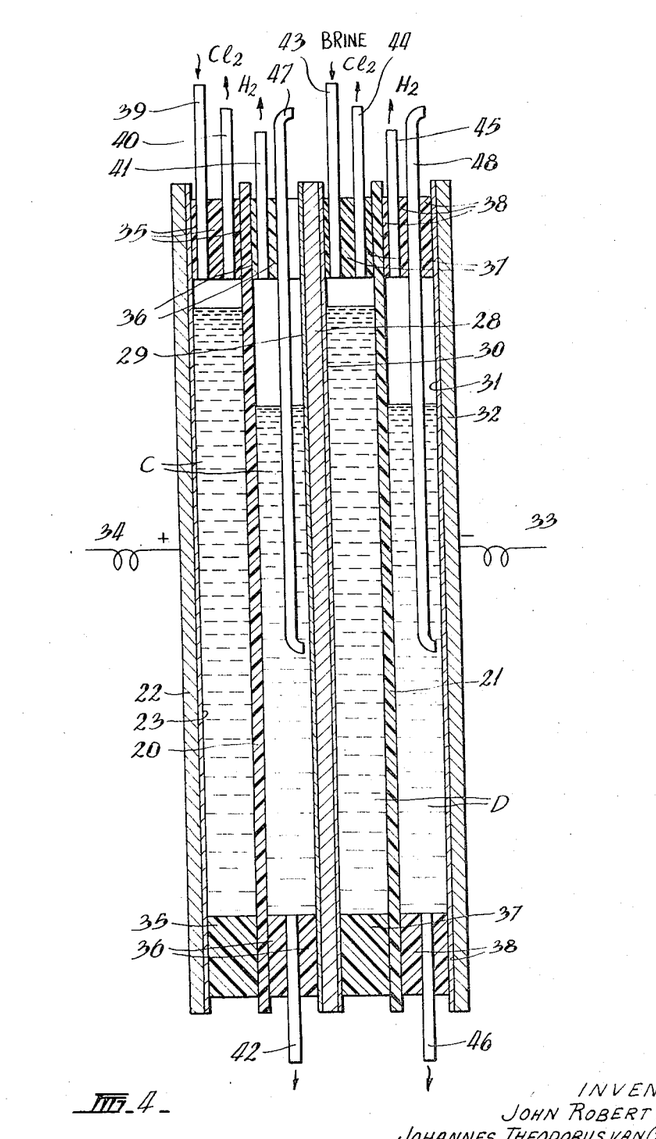
FIG. 4 is a vertical cross-section through a diaphragm cell assembly.

The multiple diaphragm cell assembly shown in FIG. 4 consists of two cells C and D identical in size, with porous polythene diaphragms 20 and 21, respectively, dividing the cells symmetrically. The outer wall of the anodic compartment of cell C is constituted by the anode which consists of a titanium sheet 22 to the inside surface of which is applied a coating 23 of platinum. The dividing wall between the cells C and D is a titanium sheet 28, the cathodic surface of which within cell C is a coating 29 of an alloy consisting of approximately 45% by weight molybdenum and 55% by weight cobalt of a thickness of approximately 0.002 cm.

The other side of the sheet 28 is coated with a platinum coating 30 which constitutes the anodic surface of cell D. The cathodic surface of cell D is a coating 31 of an alloy consisting of approximately 45% by weight molybdenum and 55% by weight cobalt, approximately 0.002 cm. thick, applied to the inner surface of the titanium outer wall 32 of the cell. An electrical conductor 33 connects the sheet 32 to the negative terminal of a source (not shown) of direct current, and a further electrical conductor 34 connects the sheet 22 to the positive terminal of the same source.

The cells C and D are completed in a fluid-tight manner, and the sheets 22, 28 and 32 and membranes 20 and 21 are positively spaced apart by rectangular polyethene washers 35, 36, 37 and 38 which are of similar shape to the washers 11 of FIGS. 2 and 3, and extend around the margins of the sheets. A pipe 39 through which electrolyte may be supplied to the cell C, and a further pipe 40 through which chlorine is led off from the cell C, both penetrate the washer 35 on the side of the membrane 20 adjacent to the sheet 22. On the side of the membrane 20 adjacent to the sheet 28, a pipe 41 through which hydrogen may escape from the top of the cell and a pipe 42 through which caustic cell liquor may be removed from the bottom of the cell, penetrate the polythene washer 36. Pipes 43 and 44, respectively, for the supply of electrolyte to and removal of chlorine from the cell D penetrate the upper portion of the polythene washer 37 on the side of the membrane 21 adjacent to the sheet 28. On the other side of the membrane 21, the washer 38 is penetrated by a pipe 45 at the top of the cell for the removal of hydrogen and by a pipe 46 at the bottom of the cell for the removal of caustic cell liquor.

A Luggin capillary 47 penetrates the polythene washer 36 at the top of cell C to extend to a position slightly spaced from the centre of the cathode surface 29. A further Luggin capillary 48 penetrates the polythene washer 38 at the top of cell D to extend to a position slightly spaced from the centre of the cathode surface 31. Each of these Luggin capillaries is connected by a salt bridge to an individual calomel reference electrode (not shown) in the usual manner. These Luggin capillaries and associated calomel electrodes are not part of the cell assembly in the form in which it would be used in commercial operations, but have been included to permit measurements to be made. If desired, cell assemblies comprising more than two compartments can be constructed in an analogous manner. Examples 19 to 31 inclusive were carried out in a cell of the type shown in FIG. 4.

Our invention is now illustrated by, but is not limited to the following examples:

*Example 1*

Twenty mild steel plates of ⅛ in. thickness were subjected to a pretreatment consisting in degreasing with trichlorethylene, drying and treating for 10 minutes at room temperature (20±2° C.) with 17% w./v. hydrochloric acid. The samples were then rinsed with distilled water and dried in the oven at 110° C.

After the pretreatment they allowed to "age" by exposure to the open atmosphere in a chlorine producing factory for 4 weeks. A fine surface of rust was formed on the steel during this period. Each aged sample in succession was then made the cathode of an electrolytic cell for the production of sodium hydroxide and chlorine and the cathode potential was measured at three current densities. The potential of the aged electrodes was lower than that of bright steel untreated or acid treated.

Each of the three results given in Table II is the means of these twenty determinations and was used subsequently as a basis for calculation of the lowering of overvoltage in Examples 2 to 15 inclusive.

*Example 2*

A mild steel sample was degreased, acid treated by immersing it in 17% hydrochloric acid for 5 minutes at 20° C. and rinsed with distilled water. It was then electroplated in a plating solution of the following composition: 50 g./l. of Na₂WO₄.2H₂O, 7 g./l. of FeSO₄(NH₄)₂SO₄.6H₂O(II)

8.7 g./l. of FeNH₄(SO₄)₂.12H₂O(III), 66 g./l. of citric acid and NH₄H to pH 8.0 for 7 minutes at 70° C. at a current density of 10 a./dm.². A bright metallic deposit was formed. The sample was then made the cathode in a diaphragm cell for the production of sodium hydroxide and chlorine. Cathode potentials of this sample in alkaline brine were measured. Results are shown in Table II.

*Example 3*

A mild steel plate was acid treated as in Example 2 and electroplated in the following solution: 3.6 g./l. of Na₂WO₄.2H₂O, 85.6 g./l. of FeSO₄.7H₂O, 66 g./l. of citric acid and NH₄OH to pH 8.0. The current density was 10 a./dm.² maintained for 5 minutes at 70° C. A steel anode was used. The sample was then made the cathode in a diaphragm cell for the production of sodium hydroxide and chlorine. Cathode potentials are recorded in Table II.

*Example 4*

A mild steel plate was prepared as in Example 2. Electroplating was carried out in a plating solution of the following composition: 32 g./l. of Na₂MoO₄.2H₂O, 11.9 g./l. of CoCl₂.6H₂O, 40 g./l. of Na₄P₂O₇, 80 g./l. of NaHCO₃ nd 1.5 g./l. of N₂H₃.H₄SO₄, using a graphite anode at 60° C. for 15 minutes at a current density of 5 a./dm.². The deposit obtained was semi-bright to matt grey. The sample was then made the cathode in a diaphragm cell for the production of sodium hydroxide and chlorine. Cathode potentials are given in Table II.

*Example 5*

Example 4 was repeated but the current density was maintained at 24 a./dm.² for a period of 3 minutes. The deposited coating was indistinguishable in appearance from that of Example 4. Results are stated in Table II.

*Example 6*

A mild steel plate pretracted as in Example 2 was electroplated in a bath of the following composition: 155 g./l. of CoSO₄.7H₂O, 295 g./l. of sodium citrate, 206 g./l. of Na₂MoO₄.2H₂O and NH₄OH to pH 10.5, at a current density of 10 a./dm.² for 10 minutes at 25° C. using platinum anodes. A dark deposit was obtained. The sample was then made the cathode in a diaphragm cell for the production of sodium hydroxide and chlorine. Cathode potentials are recorded in Table II.

*Example 7*

A mild steel plate was acid pretreated as described in Example 2 and plated in a bath of the following composition: 40 g./l. of Na₂MoO₄.2H₂O, 11.4 g./l. of NiCl₂.6H₂O 33 g./l. of Na₄P₂O₇ and 80 g./l. of NaHCO₃ using a graphite anode at 70° C. and a current density of 50 a./dm.² for a period of 2 minutes. The sample was then made the cathode in a diaphragm cell for the production of sodium hydroxide and chlorine. Cathode potentials during electrolysis are shown in Table II.

*Example 8*

An acid treated mild steel sample was electroplated in a solution of the following composition: 40 g./l. of Na₂MoO₄.2H₂O 11.4 g./l. of NiCl₂.6H₂O, 33 g./l. of Na₄P₂O₇ and 80 g./l. of NaHCO₃. A graphite anode was used with a bath temperature of 70° C. A plating current density of 5 a./dm.² was maintained for a period of 20 minutes. A light grey metallic electroplate was produced. The sample was then made the cathode in a diaphragm cell for the production of sodium hydroxide and chlorine. Cathode potentials are given in Table II.

*Example 9*

Experiment 8 was repeated but the current density was altered to 50 a./dm.² maintained for 1½ minutes. A dark grey lustrous deposit was obtained. The sample was then made the cathode in a diaphragm cell for the production of sodium hydroxide and chlorine. Figures are given in Table II. Comparison of Examples 8 and 9 shows that low discharge potentials for hydrogen were recorded over a wide range of plating current densities.

*Example 10*

A mild steel plate was pretreated as in Example 2. Electroplating was carried out in a bath of the following composition: 40 g./l. of Na₂MoO₄.2H₂O, 9 g./l. of FeCl₃.6H₂O 27 g./l. of Na₄P₂O₇ and 75 g./l. of NaHCO₃, at 50° C. A graphite anode was used. The sample was plated for 30 minutes at a current density of 3 a./dm.². A light grey metallic deposit was formed. The sample was then made the cathode in a diaphragm cell for the production of sodium hydroxide and chlorine. Results are given in Table II.

*Example 11*

Example 12 was repeated using, however, a higher current density, 50 a./dm.² for 4 minutes. A grey metallic deposit of appearance similar to that of Example 10 was obtained. The electrode was then made the cathode of an electrolytic cell for the production of caustic soda solution and chlorine. The cathode potential obtained is shown in Table II. The widely differing current densities of Examples 10 and 11 again produced no appreciable difference in hydrogen overvoltage.

*Example 12*

A mild steel plate was pretreated as in Example 2. It was transferred to a plating bath of the following composition: 40 g./l. of Na₂MoO₄.2H₂O, 4.5 g./l. of FeCl₃.6H₂O 5.9 g./l. of CoCl₂.6H₂O, 45 g./l. of Na₄P₂O₇.10H₂O, 75 g./l. of NaHCO₃ and 1.5 g./l. of N₂H₄.H₂SO₄. Plating was carried out at 60° C. and a current density of 5 a./dm.² for 15 minutes using a graphite anode. The resulting deposit was bright grey in appearance. The sample was then made the cathode in a diaphragm cell for the production of sodium hydroxide and chlorine. Results are shown in Table II.

*Example 13*

A sample of mild steel plate, acid treated as described in Example 2 was plated in a solution of the following composition: 40 g./l. of Na₂MoO₄.2H₂O, 4.5 g./l. of FeCl₃.6H₂O, 5.9 g./l. of NiCl₂.6H₂O, 45 g./l. of Na₄P₂O₇.10H₂O 75 g./l. of NaHCO₃ and 1.5 g./l. of N₂H₄.H₂SO₄. Bath temperature was held at 60° C. while plating was carried out at a cathode current density of 15 a./dm.² for a period of 6 minutes. A light grey metallic electro-deposit was formed on the mild steel cathode. The sample was then made the cathode in a diaphragm cell for the production of sodium hydroxide and chlorine. Data are shown in Table II.

*Example 14*

A mild steel specimen was acid treated as in Example 2. This was electroplated in a solution of the following composition: 32 g./l. of Na₂MoO₄·2H₂O, 5.7 g./l. of NiCl₂·6H₂O, 5.9 g./l. of CoCl₂·6H₂O, 56 g./l. of $Na_4P_2O_7 \cdot 10H_2O$, 75 g./l. of $NaHCO_3$ and 1.5 g./l. of $N_2H_4 \cdot H_2SO_4$ at a current density of 5 a./dm.² for 15 minutes. The bath temperature was 60° C. and a graphite anode was used. The sample was then made the cathode in a diaphragm cell for the production of sodium hydroxide and chlorine. Cathode potentials are recorded in Table II.

*Example 15*

A mild steel plate was acid treated as described in Example 2 and placed in a plating solution of the following composition: 85 g./l. of $NiSO_4 \cdot 7H_2O$, 88 g./l. of sodium citrate, 48 g./l. of $Na_2MoO_4 \cdot 2H_2O$ and $NH_4OH$ to pH 10.5. Electroplating was carried out for 20 minutes at 5 a./dm.² and 35° C. using a molybdenum anode. The resulting deposit was matt grey. The sample was then made the cathode in a diaphragm cell for the production of sodium hydroxide and chlorine. Results are given in Table II.

*Example 16*

The mild steel gauze cathodes of three industrial scale diaphragm cells of the vertical cathode type were degreased, acid treated, rinsed and plated as described in Example 10. The plating and operating currents were chosen to be as in Example 10, making the simplifying assumption that the whole of the exposed surface of the cathode gauze is electrically effective. The cathodes were then installed in three industrial cells and run concurrently with three control cells with conventional mild steel electrodes. Measurements of operating voltages under plant conditions were taken over 40 days three times daily. The mean of all measurements on the controls was 0.20 v. higher than the mean of all the cells with molybdenum-iron plated cathodes.

*Example 17*

The mild steel gauze cathodes of three industrial scale diaphragm cells of the vertical cathode type were degreased, acid treated, rinsed and plated as described in Example 8. The plating and operating currents were chosen to be as in Example 8, making the simplifying assumption that the whole of the exposed surface of the cathode gauze is electrically effective. The cathodes were then installed in three industrial cells and run concurrently with three control cells with conventional mild steel electrodes. Measurements of operating voltages under plant conditions were taken over 40 days three times daily. The mean of all measurement on the controls was 0.27 v. higher than the mean of all the cells with molybdenum-nickel plated electrodes.

*Example 18*

A rectangular piece of rolled titanium sheet (grade 130 as defined in I.C.I. Brochure Wrought Titanium, 4th edition (1958), page 5, manufactured by Imperial Chemical Industries Ltd., 20 S.W.G.), was treated for a period of 5 minutes at a temperature of 60° C. in a solution of the following composition: 200 mls. conc. HCl, 56 g. of NaF, 142 g. of $H_3Bo_3$ per litre of aqueous solution. After rinsing with distilled water the sample was transferred to a strike bath which contained 20 gram/litre of cobalt as the sulphate, and hydrochloric acid was added to give a pH of from 0.5 to 1.0. The purpose of the pretreatment in a strike bath was to facilitate subsequent deposition of the alloy. Using the titanium sample as the cathode and a sheet of platinised titanium as the anode, an electrolysing current of 20 amperes/dm.² of cathode surface was passed for 3 minutes. The titanium sample was then transferred to an alloy plating bath of the following composition: 12 grams of molybdenum as sodium molybdate, 4 grams of nickel as nickel sulphate, 200 grams Rochelle salt and 50 grams of sodium chloride per litre of solution. Ammonium hydroxide was added to adjust the pH to 10.5 at 37° C., the temperature used for plating. A piece of sheet titanium was plated in this bath for 20 minutes at a current density of 1.0 amp./dm.² using a nickel anode. A lustrous metallic grey deposit about 0.002 cm. thick comprising 25% molybdenum and 75% nickel was obtained.

The electroplated titanium sample was then made the cathode of a chlorate multicell. The cell was a two-cell assembly of the bipolar type as shown schematically in FIGURES 2 and 3. The cell was designed primarily for comparison of electrode materials, the greatest attention being given to identical geometrical arrangement and dimensions of the two compartments. By interchanging the components it was demonstrated that the two compartments were geometrically and hydrodynamically equivalent.

Electrolyte consisting of an aqueous solution of 316 g./l. of sodium chloride, to which 6 g./l. of anhydrous sodium chromate were added, was supplied to the cells. The first cell (A), with the platinised titanium anode and etched titanium sheet cathode, remained unchanged and undisturbed during the tests, and so served as a control. By changing the cathode 9 of the second cell (B) a direct comparison of cathode materials could be obtained. Results are presented for the following cathode materials:

(a) Etched titanium sheet, which had been etched for 3 days in concentrated A.R. grade hydrochloric acid. The surface of this sheet was hydrided.

(b) Platinised titanium prepared by electroplating titanium sheet from an alkaline hydroxy-platinate bath to a density of 80 g. platinum per square metre according to methods shown in the prior art.

(c) Mild steel sheet, pretreated by prolonged exposure to atmosphere to produce a rusty surface, the oxide layer being reduced to magnetite during service as a cathode, as is well known in the prior art.

(d) Sheet titanium metal electroplated with an alloy of molybdenum and nickel, as described above. Results are given in Table III.

The molybdenum nickel plated titanium sheet was then made the cathode of an electrolytic diaphragm two-cell assembly of the construction shown in FIG. 4, the electrolyte in the cathode compartment in this case consisting of an aqueous solution containing 200 g./l. of sodium chloride and 100 g./l. of sodium hydroxide. Measurements of potential were made between the calomel reference electrodes and the coatings 29 and 31 while electrolysis was in progress. The measured potentials were then compared with values obtained when a pure titanium sheet was substituted for the sheet 32, and at 60° C., the values for the molybdenum nickel coated cathode were found to have an overvoltage lower by 150 millivolts for a current density of 1 a./dm.² and by 220 millivolts for a current density of 10 a./dm.², than for the pure titanium sheet, as shown in Table II.

TABLE III

| Electrodes | | Cell Voltage at current density of— | | Temp. °C. |
| --- | --- | --- | --- | --- |
| Anode | Cathode | 1 Amp./dm.² | 10 Amp./dm.² | |
| Pt/Ti | Ti | 4.03 | 5.60 | 40 |
| Pt/Ti | Fe | 3.63 | 5.24 | 40 |
| Pt/Ti | Pt/Ti | 3.61 | 5.26 | 40 |
| Pt/Ti | Mo/Ni on Ti. | 3.65 | 5.19 | 40 |

As shown in Table III cells using a titanium cathode plated with the molybdenum-nickel alloy exhibited a cell voltage approximately 0.4 volt lower than a cell with a titanium cathode at the lower current density. As a cathode material the molybdenum-nickel electroplated titanium cathode also compared favourably with rusted mild steel, one of the conventional cathode materials for chlorate cells, and with the recently developed platinised titanium.

Example 19

The titanium specimen was etched as described in Example 18 and transferred to a plating bath of the following composition: 50 g./l. of $Na_2 \cdot WO_2 \cdot 2H_2O$, 7 g./l. of $FeSO_4(NH_4)_2SO_4 \cdot 6H_2O$, 8.7 g./l. of $$FeNH_4 \cdot (SO_4)_2 \cdot 12H_2O$$

66 g./l. of citric acid and $NH_4OH$ to pH 8.0. The bath colour was light brown and darkened on the addition of ammonia for pH adjustment. Steel anodes were used in the electroplating which was carried out at a cathode current density of 10 a./dm.$^2$ for 7 minutes at 70° C. A bright metallic grey electroplate was produced. The plated sample was then made the cathode in an electrolytic cell for the production of caustic soda and chlorine. Composition of the plating and cathode potential are shown in Table II.

Example 20

Experiment 19 was repeated with all conditions identical but for cathode current density, which was 50 a./dm.$^2$ and plating time, 2 minutes. A bright metallic grey plate was produced. The plated sample was then made the cathode in an electrolytic cell for the production of caustic soda and chlorine. Composition and cathode potential are given in Table II.

Example 21

A sample of titanium etched as described in Example 18 was plated with a tungsten-iron alloy in a bath of the following composition: 100 g./l. of $Na_2WO_4 \cdot 2H_2O$, 9.5 g./l. of $FeSO_4 \cdot 7H_2O$, 66 g./l. of citric acid and $NH_4OH$ to pH 8, using a tungsten anode. The bath temperature was 60° C. and the current density of plating 17.5 a./dm.$^2$ for 6 minutes. The plated sample was then made the cathode in an electrolytic cell for the production of caustic soda and chlorine. The cathode potentials appear in Table II.

Example 22

A piece of titanium was pretreated as described in Example 18 and electroplated in a bath of the following composition: 40 g./l. of $Na_2MoO_4 \cdot 2H_2O$, 9 g./l. of $$FeCl_3 \cdot 6H_2O$$

27 g./l. of $Na_4P_2O_7$ and 75 g./l. of $NaHCO_3$. A mild steel cathode was used with a bath temperature of 50° C. The piece of titanium was electroplated for 30 minutes at a cathode current density of 3 a./dm.$^2$. A bright metallic electrodeposit was formed. The sample was then used as a cathode in an electrolytic cell for the production of caustic soda and chlorine. Results are as shown in Table II.

Example 23

Example 22 was repeated, but the plating was carried out at a density of 50 a./dm.$^2$ at 58° C., maintained for 4 minutes. A matt grey deposit was obtained. The sample was then made the cathode in a caustic/chlorine diaphragm cell. Results are given in Table II. Although samples 22 and 23 differed in appearance and were prepared at widely differing current densities, their compositions and overvoltage characteristics differed little as apparent from Table II. Furthermore, samples prepared at intermediate current densities gave similar cathode discharge potentials.

Example 24

A titanium specimen was etched as in Example 18 and plated in a bath of the following composition: 40 g./l. of $Na_2MoO_4 \cdot 2H_2O$, 11.4 g./l. of $NiCl_2 \cdot 6H_2O$, 33 g./l. of $Na_4P_2O_7$ and 80 g./l. of $NaHCO_3$ using a graphite anode at 70° C. and a current density of 50 a./dm.$^2$ for a period of 2 minutes. The plated sample was then made the cathode in an electrolytic cell for the production of caustic soda and chlorine. Cathode potentials during electrolysis are shown in Table II.

Example 25

Example 24 was repeated but the current density was 2.5 a./dm.$^2$, maintained for 40 minutes. Results are shown in Table II.

Example 26

A titanium sample was pretreated as in Example 18 and electroplated in a bath of the following composition: 32 g./l. of $Na_2MoO_4 \cdot 2H_2O$, 11.9 g./l. of $$CoCl_2 \cdot 6H_2O$$

40 g./l. of $Na_4P_2O_7$, 80 g./l. of $NaHCO_3$ and 1.5 g./l. of $N_2H_4 \cdot H_2SO_4$. Current density was 2.5 a./dm.$^2$, plating period 30 minutes. A graphite anode was used with a bath temperature of 70° C. During plating, the colour of the solution, being initially magenta, became more bluish. A semi-bright metallic electroplate was produced. The plated sample was then made the cathode in electrolytic cells for the for the production of caustic soda and chlorine. Data for this alloy appear in Table II.

Example 27

Example 26 was repeated using, however, a current density of 25 a./dm.$^2$ over a period of 3 minutes. A matt grey deposit was formed. Results are given in Table II. With the alloys of Examples 26 and 27, too, the hydrogen overvoltage was affected little by the plating current density; this was shown by further experiments at intermediate current densities.

Example 28

A ternary alloy of molybdenum, nickel and cobalt was electroplated on etched titanium from a bath of the following composition: 32 g./l. of $Na_2MoO_2 \cdot 2H_2O$, 5.7 g./l. of $NiCl_2 \cdot 6H_2O$, 5.9 g./l. of $CoCl_2 \cdot 6H_2O$, 45 g./l. of $$Na_4 \cdot P_2O_7 \cdot 10H_2O$$

75 g./l. of $NaHCO_3$ and 1.5 g./l. of $N_2H_4 \cdot H_2SO_4$. A platinised titanium anode was used, with a bath temperature of 60° C. at a current density of 5 a./dm.$^2$ for 15 minutes to produce a light grey metallic deposit. The plated sample was then made the cathode in an electrolytic cell for the production of caustic soda and chlorine. Data for this alloy are shown in Table II.

Example 29

Example 28 was then repeated using a cathode current density of 15 a./dm.$^2$. The appearance of the plate was similar to that of Example 29 but it exhibited poorer adherence around the edges of the sample. Results are given in Table II.

Example 30

A titanium sample was etched as described in Example 18 and plated in the following solution: 40 g./l. of $$Na_2MoO_4 \cdot 2H_2O$$

4.5 g./l. of $FeCl_3 \cdot 6H_2O$, 5.9 g./l. of $NiCl_2 \cdot 6H_2O$, 45 g./l. of $Na_4P_2O_7 \cdot 10H_2O$, 75 g./l. of $NaHCO_3$ and 1.5 g./l. of $N_2H_4 \cdot H_2SO_4$. The bath temperature was 60° C., current density was 15 a./dm.$^2$ maintained for 6 minutes and a graphite anode was used. A bright metallic deposit was formed. The plated sample was then made the cathode in an electrolytic cell for the production of caustic soda and chlorine. Cathode potentials in caustic brine are given in Table II.

Example 31

A titanium sample was pretreated as in Example 18. A ternary alloy of molybdenum, iron and cobalt was electroplated on to the etched titanium from the following solution: 40 g./l. of $Na_2MoO_4.2H_2O$, 4.5 g./l. of $FeCl_3.6H_2O$, 5.9 g./l. of $CoCl_2.6H_2O$, 45 g./l. of $$Na_4P_2O_7.10H_2O$$

75 g./l. of $NaHCO_3$ and 1.5 g./l. of $N_2H_4.H_2SO_4$. A platinised titanium anode was used with bath temperature 60° C. The plating current density was 5 a./dm.² for 15 minutes. The resulting deposit was light grey. The plated sample was then made the cathode in an electrolytic cell for the production of caustic soda and chlorine. Cathode potentials for this alloy are shown in Table II.

What we claim is:

1. An electrolytic cell suitable for assembly into multicells comprising a bipolar electrode made from a core of titanium, at least a portion of the anodic surface of which is covered conductively by a layer of a noble metal of the platinum group and at least a portion of the cathodic surface of which is conductively covered by a coating of an alloy consisting of a metal selected from the group consisting of from 5 to 70% of molybdenum and from 5 to 60% of tungsten, said metal being alloyed with iron, which bipolar electrode forms the dividing wall between the cathodic and the anodic compartments of adjacent cells.

2. An electrolytic cell suitable for assembly into multicells comprising a bipolar electrode made from a core of titanium, at least a portion of the anodic surface of which is conductively covered by a layer of a noble metal of the platinum group and at least a portion of the cathodic surface of which is conductively covered by a coating consisting of an alloy of molybdenum with a metal selected from the group consisting of from 95 to 30% of cobalt and from 95 to 35% of nickel, which bipolar electrode forms the dividing wall between the cathodic and anodic compartments of adjacent cells.

3. An electrolytic cell suitable for assembly into multicells comprising a bipolar electrode made from a core of titanium, at least a portion of the anodic surface of which is covered conductively by a layer of a noble metal of the platinum group and at least a portion of the cathodic surface of which is conductively covered by a coating of a ternary alloy consisting of from 5 to 60% of a primary metal selected from the group consisting of molybdenum and tungsten, said primary metal being alloyed with two metals selected from the group consisting of cobalt, nickel and iron, which bipolar electrode forms the dividing wall between the cathodic and the anodic compartments of adjacent cells.

4. An electrode comprising a support formed from a metal selected from the group consisting of mild steel, titanium and a titanium base alloy, at least a portion of the surface of which is conductively covered by a coating of an alloy consisting of a metal selected from the the group consisting of from 5 to 70% of molybdenum and from 5 to 60% of tungsten, said metal being alloyed with iron.

5. An electrode comprising a support formed from a metal selected from the group consisting of mild steel, titanium and a titanium base alloy, at least a portion of the surface of which is conductively covered by a coating of an alloy consisting of molybdenum alloyed with a secondary metal selected from the group consisting of from 95 to 35% of nickel and from 95 to 30% of cobalt.

6. An electrode comprising a support formed from a metal selected from the group consisting of mild steel, titanium and a titanium base alloy, at least a portion of the surface of which is conductively covered by a coating of a ternary alloy consisting of from 5 to 60% of a primary metal selected from the group consisting of molybdenum and tungsten, said primary metal being alloyed with two metals selected from the group consisting of cobalt, nickel and iron.

7. An electrode according to claim 4 characterised in that the metal of the support is mild steel.

8. An electrode according to claim 5 characterised in that the metal of the support is mild steel.

9. An electrode according to claim 6 characterised in that the metal of the support is mild steel.

10. An electrode according to claim 4 characterised in that the metal of the support is titanium.

11. An electrode according to claim 5 characterised in that the metal of the support is titanium.

12. An electrode according to claim 6 characterised in that the metal of the support is titanium.

13. An electrode according to claim 4 where the content of molybdenum is between 45 and 65%.

14. An electrode according to claim 4 where the content of tungsten is between 35 and 60% by weight.

15. An electrode according to claim 5 characterised in that the coating contains between 5 and 70% molybdenum and between 95 and 30% of cobalt.

16. An electrode according to claim 5 characterised in that the coating contains between 45 and 70% of molybdenum and between 55 and 30% of cobalt.

17. An electrode according to claim 5 characterised in that the coating contains between 5 and 65% of molybdenum and 95 to 35% of nickel.

18. An electrode according to claim 5 characteristed in that the coating contains between 45 and 58% of molybdenum and between 55 and 42% of nickel.

19. An electrode according to claim 6 characterised in that the coating contains between 50 and 60% of the metal slected from the group consisting of molybdenum and tungsten.

20. A bipolar electrode consisting of a core of titanium, at least a portion of the anodic surface of which is conductively covered by a layer of a noble metal of the platinum group and at least a portion of the cathodic surface of which is conductively covered by a coating of an alloy consisting of a metal selected from the group consisting of from 5 to 70% of molybdenum and from 5 to 60% of tungsten, said metal being alloyed with iron.

21. A bipolar electrode consisting of a core of titanium, at least a portion of the anodic surface of which is conductively covered by a layer of a noble metal of the platinum group and at least a portion of the cathodic surface of which is conductively covered by a coating of an alloy consisting of molybdenum and a secondary metal selected from the group consisting of from 95 to 30% of cobalt and from 95 to 35% of nickel.

22. A bipolar electrode consisting of a core of titanium, at least a portion of the anodic surface of which is conductively covered by a layer of a noble metal of the platinum group and at least a portion of the cathodic surface of which is conductively covered by a coating of a ternary alloy consisting of from 5 to 60% of a primary metal selected from the group consisting of molybdenum and tungsten, said primary metal being alloyed with two metals selected from the group consisting of cobalt, nickel and iron.

23. An electrolytic cell having a cathode formed from a metal selected from the group consisting of mild steel, titanium and a titanium base alloy, at least a portion of the surface of which is conductively covered by a coating of an alloy consisting of a primary metal selected from the group consisting of from 5 to 70% of molybdenum and from 5 to 60% of tungsten, said primary metal being alloyed with iron.

24. An electrolytic cell having a cathode formed from a metal selected from the group consisting of mild steel, titanium and a titanium base alloy, at least a portion of the surface of which is conductively covered by a coating of an alloy consisting of molybdenum as a primary metal alloyed with a secondary metal selected from the group consisting of from 95 to 35% of nickel and from 95 to 30% of cobalt.

25. An electrolytic cell having a cathode formed from a metal selected from the group consisting of mild steel, titanium and a titanium base alloy, at least a portion of the surface of which is conductively covered by a coating of a ternary alloy consisting of from 5 to 60% of a primary metal selected from the group consisting of molybdenum and tungsten, said primary metal being alloyed with two metals selected from the group consisting of cobalt, nickel and iron.

References Cited by the Examiner

UNITED STATES PATENTS

| | | | |
|---|---|---|---|
| 1,477,099 | 12/1923 | Baum | 204—290 |
| 2,683,116 | 7/1954 | Zdansky | 204—129 |
| 2,801,213 | 7/1957 | Beuckman et al. | 204—32 |
| 2,997,517 | 8/1961 | Ciarlariello | 136—86 |

JOHN H. MACK, *Primary Examiner.*

D. R. JORDAN, *Assistant Examiner.*